E. F. THOMAS.
CAN SOLDERING MACHINE.
APPLICATION FILED JAN. 9, 1919.
1,368,769.
Patented Feb. 15, 1921.
3 SHEETS—SHEET 1.
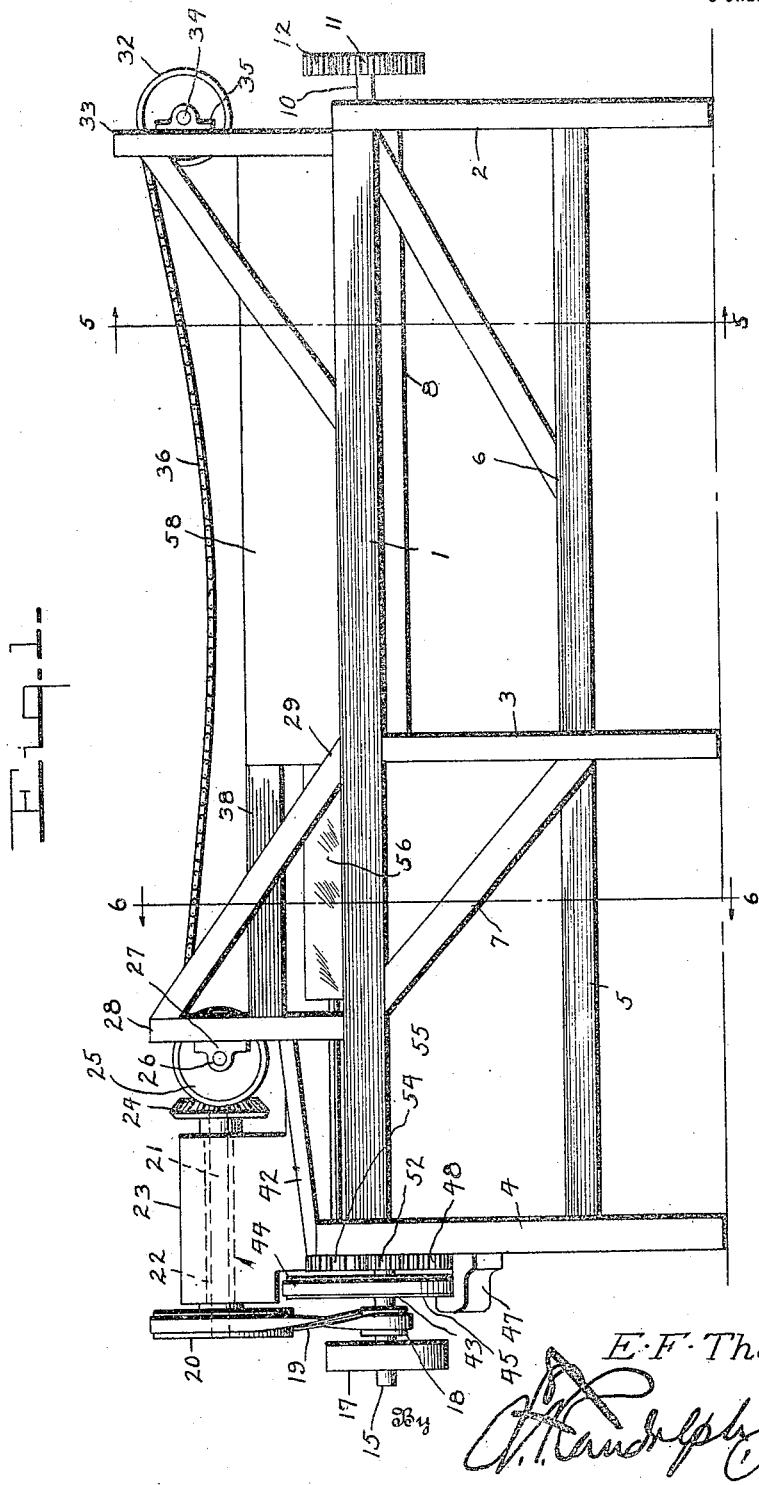
Inventor
E. F. Thomas
By
Attorney

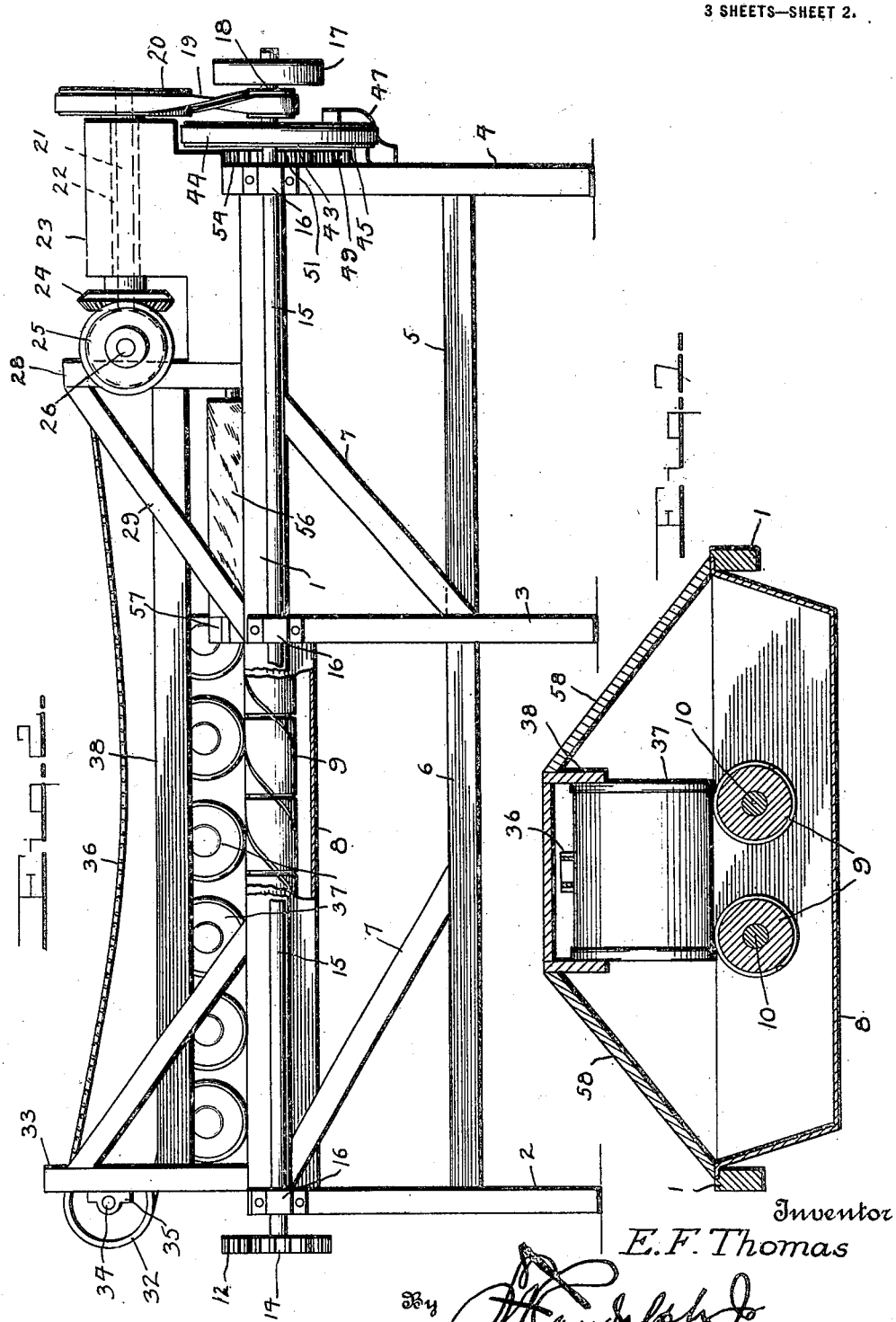

E. F. THOMAS.
CAN SOLDERING MACHINE.
APPLICATION FILED JAN. 9, 1919.
1,368,769.
Patented Feb. 15, 1921.
3 SHEETS—SHEET 3.
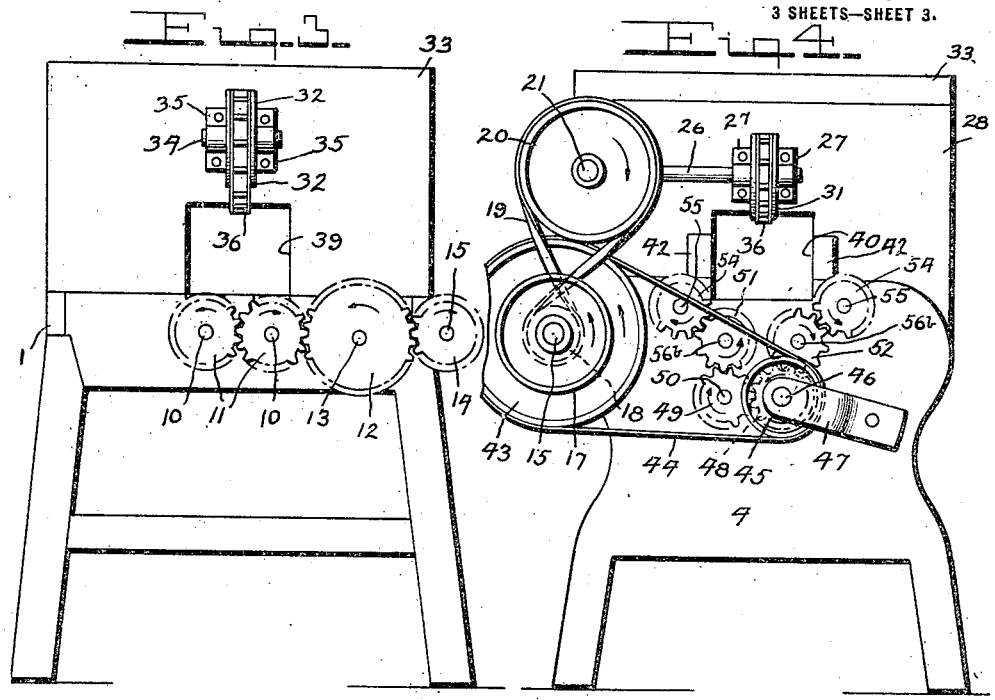
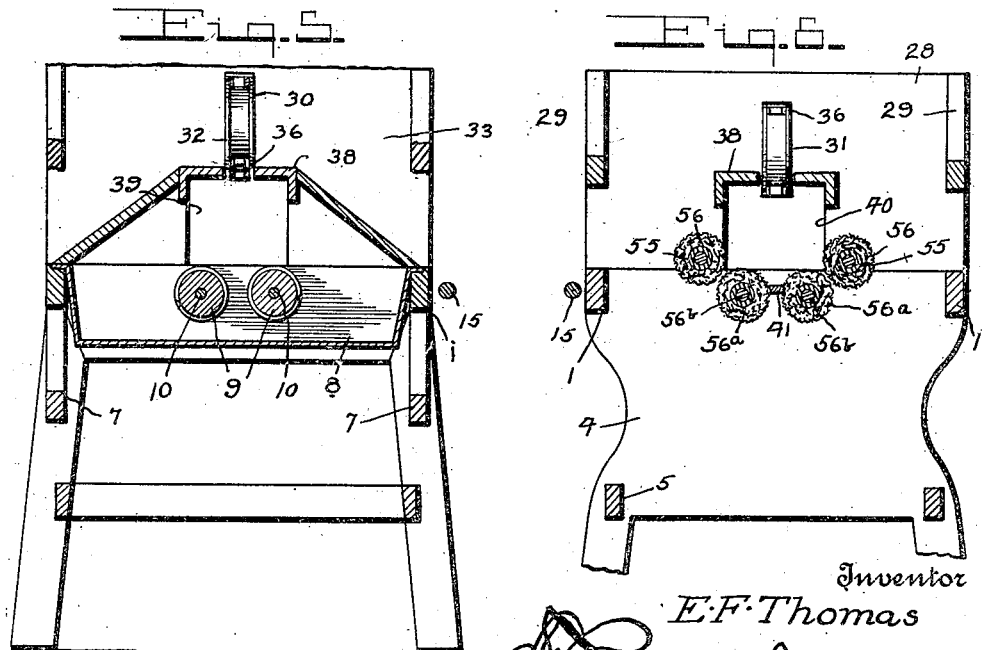
Inventor
E. F. Thomas
By
Attorney

UNITED STATES PATENT OFFICE.

EDGAR F. THOMAS, OF OCONOMOWOC, WISCONSIN.

CAN-SOLDERING MACHINE.

1,368,769.   Specification of Letters Patent.   Patented Feb. 15, 1921.

Application filed January 9, 1919. Serial No. 270,405.

*To all whom it may concern:*

Be it known that I, EDGAR F. THOMAS, a citizen of the United States, residing at Oconomowoc, in the county of Waukesha and State of Wisconsin, have invented certain new and useful Improvements in Can-Soldering Machines; and I do hereby declare the following to be a full, clear, and exact description of the invention, such as will enable others skilled in the art to which it appertains to make and use the same.

This invention relates to soldering machines, and more particularly to a machine for soldering the ends upon tin cans and similar containers.

One of the main objects of the invention is to provide a machine of the character stated of simple construction and operation in which both of the ends of a can may be soldered upon the body thereof simultaneously.

A further object is to provide coating rolls connected with a solder containing pot for cans, means being provided for moving the can over these rolls longitudinally thereof and the rolls being rotated in such direction as to force the solder in the seam or joint at each end of the can for securing the end or head thereon.

Further objects will appear from the detailed description.

In the drawings:

Figure 1 is a side view of a soldering machine constructed in accordance with my invention.

Fig. 2 is a similar view taken from the side opposite to Fig. 1.

Fig. 3 is an end view.

Fig. 4 is an end view taken from the end opposite Fig. 3.

Fig. 5 is a section taken substantially on line 5—5 of Fig. 1.

Fig. 6 is a section taken substantially on line 6—6 of Fig. 1.

Fig. 7 is a detail showing the operation of the coating rolls, the can being shown supported by these rolls in position to have the ends soldered upon the body of the can.

The supporting structure of the machine comprises a top frame 1 of substantially rectangular shape which is supported by end frame 2, a central frame 3, and an end plate 4, the frames 2 and 3 and plate 4 being braced in proper relation by brace bars 5 and 6, inclined brace bars 7 being secured to the center frame or plate 3 and the sides of the top frame 1. The structure thus produced is adapted to support the mechanism for soldering the ends upon the can and for feeding these cans over the soldering means.

A solder pot or pan 8 is supported by top frame 1 between the end frame 2 and center frame or plate 3. This pan is adapted to contain molten solder which may be heated by any suitable means so as to be retained in molten condition. Two soldering or coating rolls 9 extend longitudinally of pan 8 in parallel spaced relation, the shafts 10 of these rolls being rotatably supported through suitable bearing blocks set into the upper edges of the top bars of end frame 2 and center frame 3. These rolls are so mounted as to project into pan 8 so as to be partially immersed in the molten solder contained thereby. As will be noted, each of the rolls is provided with a plurality of annular grooves and with a helical groove which intersects these annular grooves, these grooves acting when the roll is rotated to insure that the solder will be raised by the roll for the soldering operation.

The shaft 10 of each roll 9 is provided at its end adjacent the top bar of end frame 2, with a spur pinion 11 keyed thereon. As will be noted more clearly from Fig. 3, these pinions intermesh, and one of the pinions meshes with a spur gear 12 rotatably mounted on a stub shaft 13 secured to, and projecting outwardly from, the top bar of frame 1. Gear 12 meshes with a spur pinion 14 keyed on one end of a shaft 15 which extends longitudinally of the top frame 1, this shaft being rotatably supported in suitable bearing blocks 16 secured to the end frame 2 and center frame 3, this shaft being also rotatably mounted through the end plate 4. A drive pulley 17 is secured on shaft 15 adjacent the other end thereof and is adapted to be connected by a belt to a suitable source of power so as to be rotated thereby. By rotating pulley 17 in a clockwise direction as considered from Fig. 3, the dipping rolls 9 will be caused to rotate simultaneously downwardly and outwardly in a clockwise and a counter-clockwise direction, as indicated.

A relatively small pulley 18 is secured on shaft 15 adjacent drive pulley 17 and is connected by a crossed belt 19 to a pulley 20 secured on a stub shaft 21 rotatably mounted in a bearing sleeve 22 carried by a standard 23 secured to one side of the top frame 1.

This shaft 21 is provided on its inner end with a bevel-gear 24 secured thereon which meshes with a bevel-gear 25 secured on the outer end of a countershaft 26 rotatably supported at right angles to stub shaft 21 by a bearing block 27 which is secured to a vertical supporting plate 28 mounted on top frame 1 remote from one end thereof and braced by the inclined braces 29 secured thereto and to the top frame. This plate is provided with a central vertical opening 30 through which projects a groove pulley 31 positioned in alinement with a similar pulley 32 supported on a vertical plate 33 at the other end of frame 1 similar to plate 28, this latter pulley being secured upon a shaft 34 supported by bearing blocks 35 secured to plate 33. These two pulleys 31 and 32 receive a feed chain 36 passed thereabout, this chain being of hook-link construction and positioned midway between the coating rolls 9. The lower run of this chain is taut or tensioned so as to engage the upper portions of cans 37 supported by rolls 9 so as to move these cans along the rolls during the soldering operation. An inverted guide trough 38 is secured between the plates 28 and 33, this trough corresponding substantially in interior width to the length of the cans 37 and being so positioned as to maintain these cans upon the coating rolls during passage of the same through the machine. As will be noted, plate 33 is provided with an enlarged opening 39 positioned adjacent one end of the trough so as to permit the cans to be soldered to be fed into the machine from this end directly upon the coating rolls, plate 28 being provided with a corresponding opening 40 for discharge of the cans after completion of the soldering operation. As will be noted more clearly from Fig. 6, a central guide strip 41 is secured to the inner face of end plate 4 and projects inwardly and upwardly between wiping rolls to be later described so as to facilitate discharge of the cans after the soldering operation. This strip is positioned substantially in the plane of the shafts of the lower wiping rolls, these shafts and the strip coacting to provide a supporting structure along which the can may roll toward the plate 4 so as to be readily removed manually from the machine. To prevent lateral displacement of the can from this supporting structure, two upper guide strips 42 are secured at one end to the upper edge of plate 4 and at their other ends to the vertical supporting plate 28, these strips 42 being positioned above and slightly to one side of the wiping roll shafts. In this manner, after the soldering operation is complete, the cans are forced outwardly through the plate 28 into such position as to be readily grasped and removed from the machine.

A relatively large pulley 43 is secured on shaft 15 adjacent pulley 18, and is connected by a belt 44 to a pulley 45 secured upon a stub shaft 46 rotatably supported in end plate 4 and in a bracket 47 secured thereto. A spur gear 48 is secured on shaft 46 and meshes with a spur pinion 49 rotatable on a stub shaft 50 projecting from end plate 4. Pinion 49 meshes with a pinion 51 secured on the outer end of shaft $56^b$ of a lower wiping roll $56^a$, a similar pinion 52 being secured on the shaft $56^b$ of the other lower roll and meshing with gear 48. In this manner, the lower wiping rolls $56^a$ are rotated in opposite directions, it being understood that the gearing at the outer ends of the rolls serves to rotate them at the same speed, the object being to secure accuracy of operation of the wiping rolls and uniform speed of rotation thereof.

The pinions 51 and 52 mesh with pinions 54 secured on the outer ends of shafts 55 of upper wiping rolls 56 which, and the lower rolls, are all positioned in parallelism with and closely adjacent the coating rolls, these wiping rolls being preferably formed of fabric and acting to wipe or remove surplus solder from the ends of the cans. As will be noted, the shafts 55 of the upper wiping rolls are rotatably supported through vertical plate 28 and end plate 4, the inner ends of these shafts being supported in suitable bearings carried by the center frame 3 of the supporting structure. To protect the solder within the pan or pot 8, guard plates 58 are secured at their upper edges to the inverted guide trough 38, these plates extending the full length of the solder pan and being inclined downwardly and outwardly with their lower edges supported by the side bars of the top frame 1 of the supporting structure.

In operation, the cans to be soldered are fed into the machine through plate 33 so as to be engaged by the lower run of chain 36, this chain acting to roll the cans along the coating rolls which act as supporting members therefor. The coating rolls are so spaced that the ends of each can extend slightly beyond the centers of the rolls thus bringing the edge of the joint or seam of the end of the can in such position that the rolls during their downward and outward rotation will wipe the solder into the joints, after which the cans are fed along the wiping rolls and discharged through the plate 28, in the manner previously described, so as to be readily removed manually. The soldering operation is continuous and is simultaneous with the feeding of the cans through the machine, the solder being wiped or forced into the seams by the rolls so as to insure a neat and tight joint.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In a soldering machine, a solder pan, spaced parallel coating rolls extending into said pan and adapted to support cans to be soldered and while being moved along the same, said rolls being provided with spiral grooves, means for rotating said rolls whereby their surfaces move downwardly and outwardly with reference to the can head seam so as to force solder raised from the solder pan by the grooves into the seams at the ends of the pan for soldering the same, and means for feeding cans along the rolls.

2. In a soldering machine, a solder pan, spaced parallel soldering rolls projecting into said pan, an inverted guide trough positioned above the rolls and adapted to receive and guide cans supported by said rolls, grooved pulleys mounted adjacent each end of the machine, an endless chain passing about said pulleys and extending through said trough, and means for operating said soldering rolls to cause their surfaces to move downwardly and outwardly with reference to the can head seam, and for rotating one of said pulleys to cause movement of the chain to feed cans placed upon the soldering rolls along the same and toward the end of the machine which is remote from that end at which the solder pan is located.

In testimony whereof I affix my signature in presence of two witnesses.

EDGAR F. THOMAS.

Witnesses:
 JOHN A. KELLY,
 CHARLES FOY.